United States Patent [19]

Katsuma et al.

[11] Patent Number: 4,953,227
[45] Date of Patent: Aug. 28, 1990

[54] IMAGE MOSAIC-PROCESSING METHOD AND APPARATUS

[75] Inventors: Makoto Katsuma, Wako; Hiroyuki Kimura, Yokohama; Kazunori Urushihara, Inagi; Susumu Matsumura, Yokohama; Hiroshi Ohmura, Wako; Shunichi Tamai, Kawasaki; Hideki Tanaka, Yokohama, all of Japan

[73] Assignee: Canon Kabushiki Kaisha, Tokyo, Japan

[21] Appl. No.: 7,785

[22] Filed: Jan. 28, 1987

[30] Foreign Application Priority Data

Jan. 31, 1986 [JP] Japan .................. 61-020519
Jan. 31, 1986 [JP] Japan .................. 61-020520
Feb. 27, 1986 [JP] Japan .................. 61-042510
Feb. 27, 1986 [JP] Japan .................. 61-042511

[51] Int. Cl.$^5$ .................................. G06K 9/36
[52] U.S. Cl. ...................... 382/18; 358/456; 358/470; 382/50
[58] Field of Search ............ 382/56, 9, 18, 27, 54, 382/50; 358/283, 263, 456, 470

[56] References Cited

U.S. PATENT DOCUMENTS

| | | | |
|---|---|---|---|
| 4,222,076 | 9/1980 | Knowlton | 358/263 |
| 4,261,018 | 4/1981 | Knowlton | 358/263 |
| 4,547,811 | 10/1985 | Ochi et al. | 358/283 |
| 4,624,013 | 11/1986 | Urushibata | 382/9 |
| 4,651,287 | 3/1987 | Tsao | 358/283 |
| 4,709,395 | 11/1987 | Fischer et al. | 358/283 |
| 4,717,964 | 1/1988 | Abe et al. | 358/283 |
| 4,741,046 | 4/1988 | Matsunawa et al. | 382/18 |
| 4,742,551 | 5/1988 | Deering | 382/18 |

Primary Examiner—Leo H. Boudreau
Attorney, Agent, or Firm—Fitzpatrick, Cella, Harper & Scinto

[57] ABSTRACT

As image processing method suitable for creative image generation in which the image data of an original image are divided into plural areas each consisting of plural pixels, the shape of these areas is modified according to the image data of the original image, and the pixel data in each area are processed in accordance with a representative value of the image data.

21 Claims, 10 Drawing Sheets

IMAGE MOSAIC-PROCESSING METHOD AND APPARATUS

BACKGROUND OF THE INVENTION

1. Field of the Invention

The present invention relates to an image processing method for converting an image.

2. Related Background Art

Among such image processing methods there are already known an electronic platemaking technology employed in the printing industry, and a computerized photographic image processing technology employed in photographic processing laboratories.

As an example, in a case of photoelectrically scanning an original image with a high precision scanner such as a layout scanner or a laser color printer for obtaining a reproduced image, a signal processing unit is inserted in the process for effecting various processes such as density characteristic correction (gamma correction), gradation control, color correction, paste-up, etc., on an input density signal to achieve the following effects:

(1) correction of faded colors of a color film;

(2) shaping of gradation of highlight shadow areas and enhancement of color representation;

(3) salvaging of an image affected by an equipment malfunction or a mistake in photographing or development; and (4) representation of a creative image, expansion of imaging areas and creation of novel designs.

Such special processes are realized on digital image signals such as density signals or luminance signals obtained by photoelectrically scanning an original film with a high precision color scanner, a color image pickup tube or a color image pickup device such as a CCD.

There are already known certain special processes such as mosaic processing for obtaining regularly arranged mosaics, or posterization or solarization for obtaining an unrealistic gamma curve. However, such processes are insufficient in number for obtaining creative images, expanding image area and creating novel designs in as much variety as it is desired to do. Also there are known a paste-up function and a painting function as achievable using certain equipment such as the DPB 7000 manufactured by Quantel, the Artron 2000 manufactured by Artronix and the Response 300 manufactured by Scitex, but such processes, which the operator performs by adding images to an original image through a coordinate designating device such as tablet or a digitizer, not only requires a considerable time but also is associated with the drawback that the resulting image is affected by the artistic skill of the operator.

In the following there will be explained, as an example, a mosaic process in which a mosaic is composed of 5 pixels in the x-direction and 5 pixels in the y-direction, or of 25 pixels. The digital image information of a pixel (m, n) will be represented as a(m, n), which is a digital count obtained by A/D conversion of a density signal or a luminance signal or the original film. In the mosaic process, the pixel information a'(m, n) of the reproduced image after said process is derived from the pixel information a(m, n) of the original image by the following relationship:

$$a'(5m-i, 5n-j) = a(5m-3, 5n-3)$$

wherein $i = 1, 2, 3$ or $4$, $j = 1, 2, 3$ or $4$ and $m$ and $n$ are natural numbers. In the above-explained relation the central value of a $5 \times 5$ pixel block is taken as the representative value and is applied to other pixels in the block, but said representative value may be taken from any pixel of said block or may be the average value of the pixels.

Such conventional process of obtaining regularly arranged mosaics is associated with the following drawbacks:

(1) rectangular mosaic blocks are excessively regularly arranged; and (2) because the pixels in a block are of the same value, information is lost where the original image requires detail or where the original image contains a large amount of high-frequency components; and there is required an improved processing for generating creative images.

SUMMARY OF THE INVENTION

An object of the present invention is to provide an image processing method which is no longer associated with the aforementioned drawbacks of the prior technology, expands the range of special image processings conventionally limited in number, allows one to generate creative images, to expand the field of images and to create new designs without relying on the artistic skill of the operator, and contributes not only to the advertising and design industry dealing with photographic images but also to the general public who have had no access to special photographic processes, thereby contributing to the development of the photographic and photoprocessing industries.

Another object of the present invention is to provide an image processing method in which the form of mosaic pattern is varied according to the input image data. For example, the form of a mosaic pattern can be varied according to the contrast or spatial frequency of the input image.

Still another object of the present invention is to provide an image processing method capable of providing a more picturesque image in a mosaic processing. For example, there is provided an image processing method in which characteristics of the image form are extracted from the input image data and the form of the mosaic pattern is determined according to said characteristics. Also there is provided an image processing method in which the size of the mosaic pattern is determined according to the change in the input image data.

The foregoing and still other objects, features and advantages of the present invention will become fully apparent from the following detailed description of the preferred embodiments, which is to be taken in conjunction with the attached drawings.

BRIEF DESCRIPTION OF THE DRAWINGS

FIGS. 3, 3A and 3B are a flow chart of image processing in a first embodiment of the present invention;

FIGS. 6, 6A and 6B are flow chart of image processing in a second embodiment of the present invention;

DETAILED DESCRIPTION OF THE PREFERRED EMBODIMENTS

Figure 1:
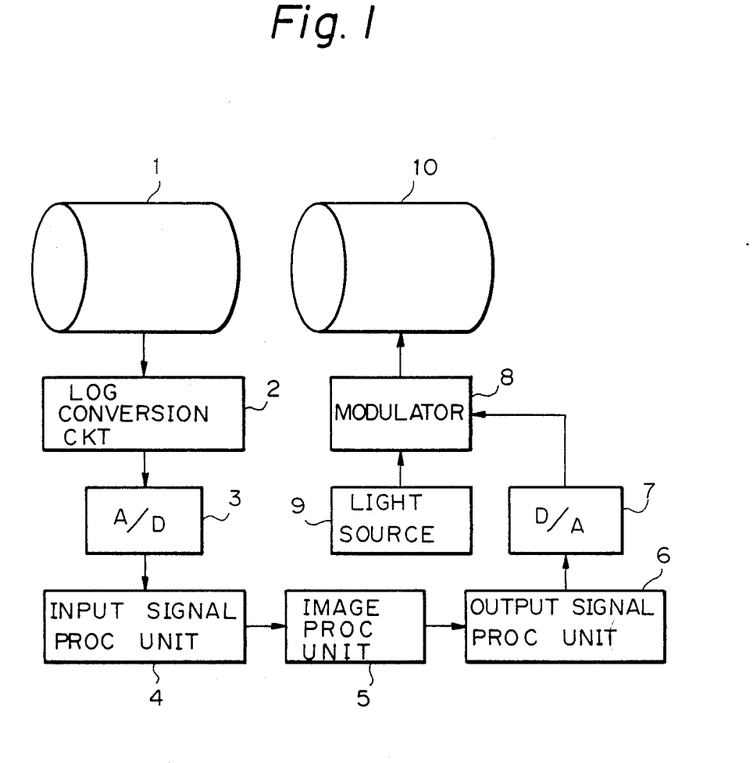
FIG. 1 is a block diagram showing an example of flow of density signal when the present invention is applied to a color scanner.

Now the present invention will be clarified in detail by description of the embodiments shown in the attached drawings FIG. 1 is a block diagram showing an example of flow of density signal when the present invention is applied to a color scanner.

An input signal, obtained by photoelectrically scanning an original film loaded on an input drum 1, is converted into a density signal by a logarithmic conversion circuit 2, and is supplied through an A/D converter 3 to an input signal processing unit 4 for converting the image density according to the species of the film so as to obtain a constant characteristic in relation to the exposure of the film. This is because the characteristic curve is different among negative, positive and reversal films, and, in the case of a color image, among red, green and blue images, particularly in a negative film. The signal is thereafter subjected to a digital image processing in an image processing unit 5 constituting an essential part of the present system. The density signal released from said image processing unit 5 is converted, in an output signal processing unit 6, into a laser beam control signal, which is supplied through a D/A converter 7 into a modulator 8 to modulate a laser beam released from a light source 9, thereby reproducing a desired image on an output drum 10.

Figure 2:
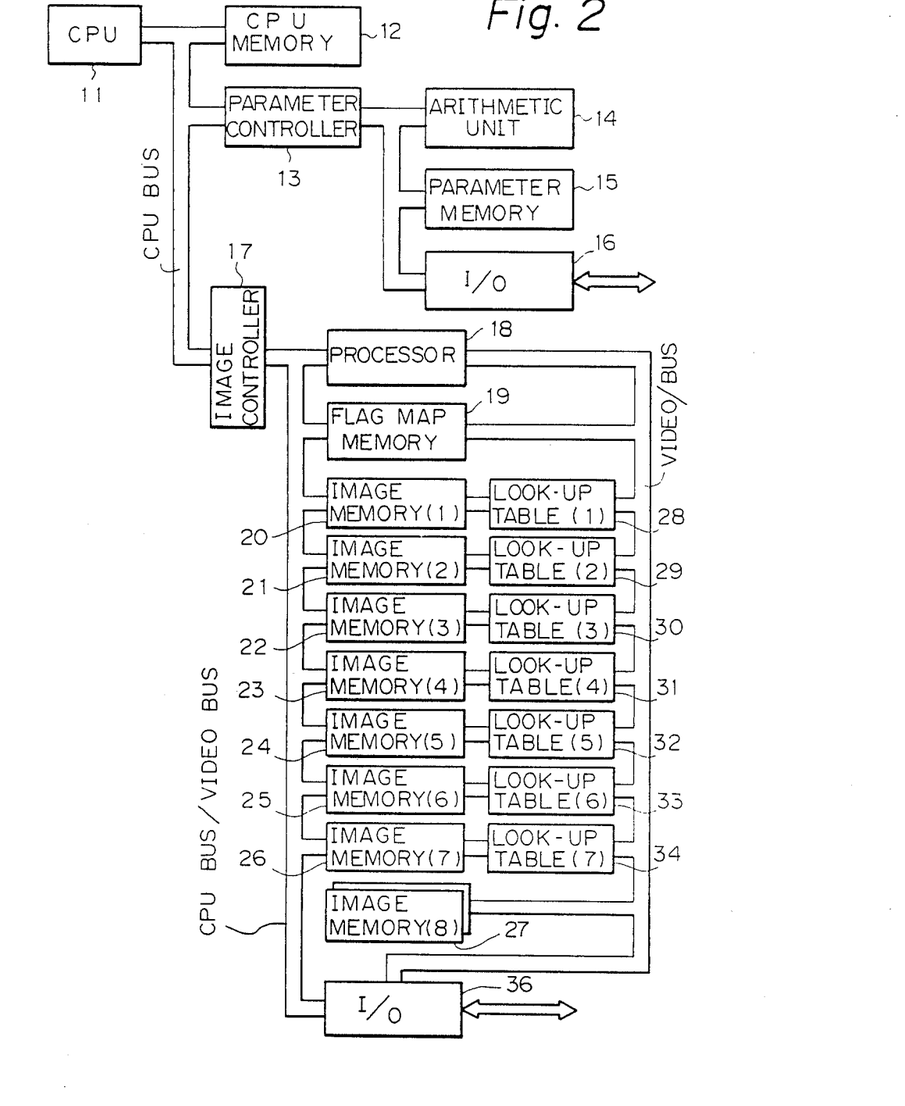
FIG. 2 is a block diagram showing the details of a part of an image processing unit shown in FIG. 1.

FIG. 2 is a block diagram showing the details of a part of the image processing unit 5.

A control processor CPU 11 governs the entire image processing unit 5 and controls the image processing, utilizing a CPU memory 12. A parameter controller 13 controls an arithmetic unit 14, a parameter memory 15 and a parameter setting input/output port (I/O) 16, and performs the initialization, setting, comparison, etc., of parameters required for image processing. A processor 18 is connected through an image controller 17 to the CPU 11 and is controlled by the commands of the CPU 11. The processor 18, constituting an essential part of the image processing unit 5, receives image data from either one of image memories 20-26, a 16-bit accumulating image memory 27 and an image data I/O 36 selected according to the instruction of the CPU 11, and supplies the result of processing to either one of the image memories 20-26, 16-bit accumulation image memory 27 and image data I/O 36 selected likewise. It can also make access to a flag map memory 19 utilized for setting carry-over flags at necessary addresses. Since the image memories 20-26 and image memory 27 are connected to a CPU bus and a video bus, it is possible for the CPU 11 to write or read data to or from an arbitrary one of said image memories 20-26 and image memory 27, or to effect real-time operation between arbitrary memories. To the outputs of said image memories there are connected look-up tables 28-34 composed of high-speed RAM's of 256×8 bits each, of which eight address lines for designating addresses or density levels 0-255 are directly connected to the outputs of the image memories, and eight data lines are connected to the video bus.

The content of each RAM can be arbitrarily read or written by the CPU 11. An image data I/O or input/output interface 36 receives image data from the input signal processing unit 4 shown in FIG. 1 or supplies image data to the output signal processing unit 6.

Figure 3A:
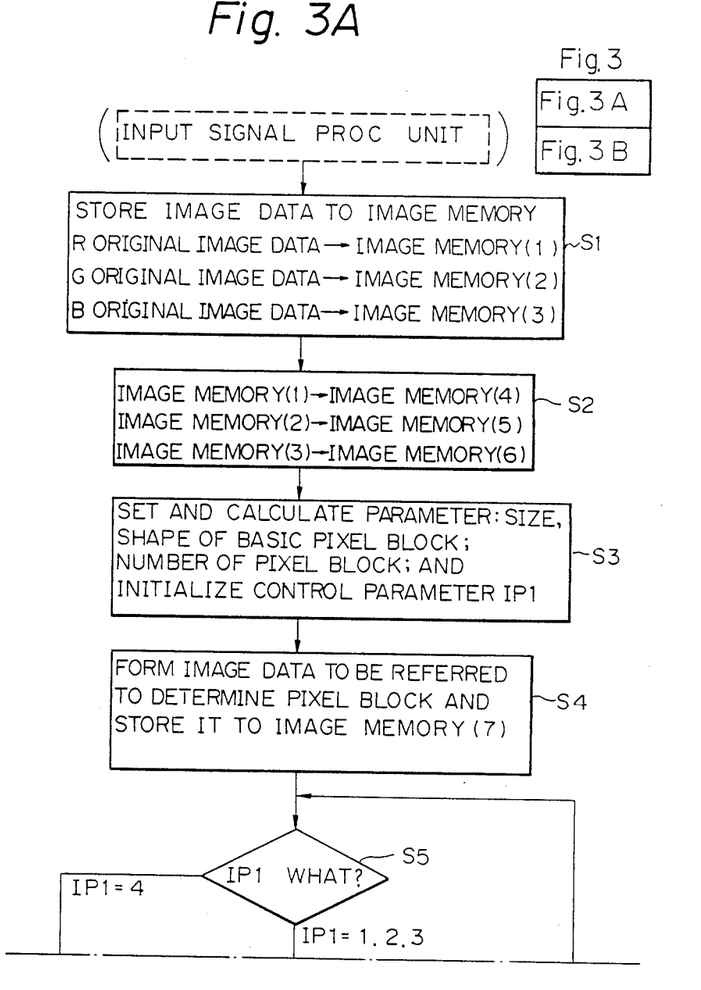
Figure 3B:
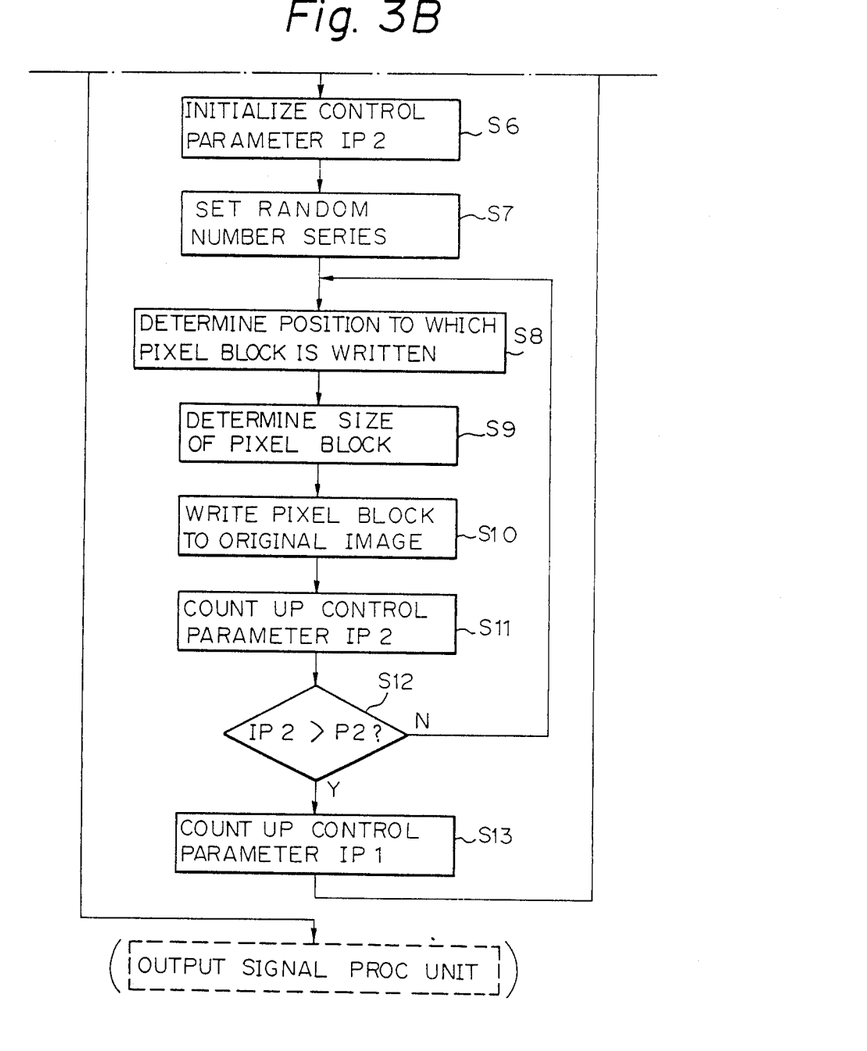
Figure 4A:
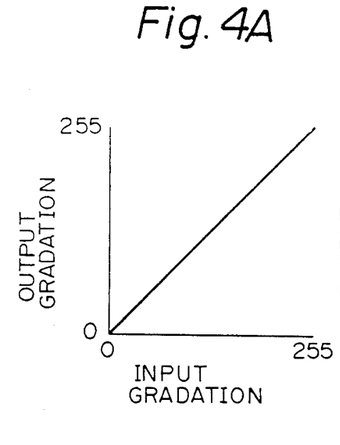
FIGS. 4A and 4B are charts showing the state of a look-up table explained in relation to FIG. 3.
Figure 4B:
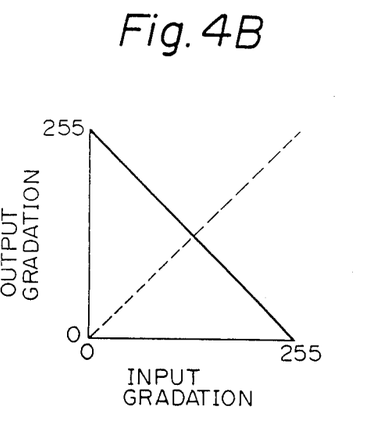

FIG. 3, consisting of FIGS. 3A and 3B, is a flow chart showing a digital image processing conducted in the image processing unit 5, while FIGS. 4A and 4B are charts indicating the status of the look-up tables 24-26, by the relation of the input density level and the output density level respectively shown on the abscissa and the ordinate. FIG. 4A shows a standard state wherein values 0, 1, . . . , 255 are recorded respectively in the addresses 0, 1, . . . , 255, so that the output is equal to the input. On the other hand, in a state shown in FIG. 4B values 255, 254, . . . , 0 are recorded in the addresses 0, 1, . . . , 255, so that the output density data are inverse to the input density data.

In the following there will be explained in detail the digital image processing executed in the image processing unit 5, with reference principally to the flow chart shown in FIG. 3. In the following explanation the density data of a digital image is represented by a form ai(m, n), wherein i indicates R, G or B respectively representing red component image data, green component image data or blue component image data of the original image. Also it is assumed that each pixel is composed of 8 bits capable of representing 256 density levels, in which 0 indicates the highest density (darkest) while 255 indicates the lowest density (lightest).

Step S1

In response to a command from the CPU 11, the processor 18 stores the red (R) component image data of the original image, received from the input signal processing unit 4 through the image data I/O 28, into the image memory (1) 20. Subsequently it stores the green (G) component image data and blue (B) component image data respectively in the image memories (2) 21 and (3) 22. In this state the look-up tables (1)-(7) 28-34 are in the standard state shown in FIG. 4A.

Step S2

The processor 18 transfers the image data in the image memory (1) 20 into the image memory (4) 23. Since the look-up table (1) 28 is in the standard state shown in FIG. 4A, the content of the image memory (1) 20 is copied, without change, in the image memory (4) 23. Similarly the image data in the image memories (2) 21 and (3) 22 are respectively copied in the image memories (5) 24 and (6) 25.

Step S3

This step sets the parameters required for the operation. In the present embodiment there are entered a parameter indicating the size of a basic pixel block and a parameter indicating the form of said basic pixel block from an unrepresented keyboard through the parameter setting I/O 16. In the following explanation it is assumed that the parameter indicating the size of the basic pixel block defines a circumscribed rectangle of $m_0 \times n_0$ for said block, and the other parameter selects a random form of the pixel block. Although the form is irregular in the present example, said form may also be firmly defined, for example, as a circle, triangle or rectangle. In such case the parameter representing the size of the basic pixel block may define the diameter in case of circle or the diameter of the circumscribed circle in the case of a polygon, instead of the side or the circumscribed rectangle. Though these parameters are to be entered by the operator through the parameter setting I/O 16 as explained above, they may be stored in the parameter memory and automatically set without entry by the operator.

The total number P1 of pixel blocks, which is a parameter required in the following processing, can be determined from the size $m_0$, $n_0$ of the above-explained basic pixel block and the size $M \times N$ of the image data, according to the following equation:

$$P1 = (M/m_0) \times (N/n_0) \times 2.$$

Subsequently a control parameter IP1 employed in the following operation is initialized to IP1=1 for a processing for the image memory (1) 20. Similarly the processing for the image memory (2) 21 or (3) 22 is conducted respectively in case of IP1=2 or IP1=3.

Step S4

This step prepares image data to be utilized as a reference in the determination of the size of the pixel block and stores said image data in the image memory (7). In the present example reference image data close to the sense of human vision are prepared by adding the red component image data in the image memory (1), green component image data in the image memory (2) and blue component image data in the image memory (3) in a proportion of R:G:B=3:6:1, but the green component image data, representing the largest contributory portion among the red, green and blue components, may be utilized alone as the reference image data. The processor 18 resets the 16-bit image memory (8), then adds the content of the image memory (1) three times to said image memory (8), the content of the image memory (2) six times and the content of the image memory (3) once. There is obtained, in the image memory (8), data Wa(m, n)=3×aR(m, n)+6×aG(m, n)+aB(m, n), wherein ai(m, n) (i=R, G or B) indicates the data of the image memory (1), (2) or (3). Said data of the image memory (8) is divided by 10 and stored in the image memory (7).

Consequently the image memory (7) has is its content aT(m, n)=(3×aR(m, n)+6×aG(m, n)+aB(m, n))/10.

Step S5

The control parameter IP1 designates the image memory to be processed. In a state IP1=1, the resulting output is stored in the image memory (1) 20 and the reference image required for processing is obtained from the image memory (4) 23. Similarly a state IP1=2 designates the image memories (2) 21 and (5) 24 respectively, and a state IP1=3 designates the image memories (3) 22 and (6) 25. At IP1=4, the processing in the image processing unit is terminated and the program proceeds to the next sequence.

Step S6

This step initializes a control parameter to IP2=1. This parameter is stepwise increased in a step S11, and is compared, in a step S12, with the number P1 of the repetition of pixel block operation determined in the step S3.

Step S7

This step sets the random numbers to be employed in the following process. The random number setting at this point allows one to employ the same random numbers in the processes for the image memories (1) 20–(3) 22, thus employing the same designated position in the block processing unit for three image memories.

Step S8

This step calculates a basic position for forming the pixel block by the random number generation. In this example the random numbers are generated in a range from 1 to M in the x-direction, and said basic position is represented as ms, ns.

Step S9

According to the values ms, ns generated in the step S8, the step S9 determines the difference d between the maximum and minimum values of the data aT(i, j) surrounded by four points $(mn-m_0/2, ns-n_0/2)$, $(ms+m_0/2, ns-n_0/2)$, $(ms+m_0/2, ns+n_0/2)$ and $(ms-m_0/2, ns+n_0/2)$ in the image memory (7). The actual pixel block size mb, nb is decreased or increased respectively when said difference d is large or small according to the following equations:

$$mb = m_0 - m_0 \times d/255$$
$$nb = n_0 - n_0 \times d/255 \text{ (results in integer)}$$

In the present embodiment the actual pixel block size mb, nb is linearly varied according to the difference d of the maximum and minimum values, but it may naturally be varied non-linearly or in plural portions.

As another embodiment, the step S9 may be executed in the following manner.

There are determined the difference d of the maximum and minimum values of the data aT(i, j) surrounded by four points $(ms-m_0/2, ns-n_0/2)$, $(ms+m_0/2, ns-n_0/2)$, $(ms+m_0/2, ns+n_0/2)$ and $(ms-m_0/2, ns+n_0/2)$ of said image memory (7), and distances Lx, Ly between the pixels of the maximum and minimum values, wherein Lx is the distance in the i-direction, and Ly is the distance in the j-direction. The actual pixel block size mb, nb is made larger or smaller respectively when said distances Lx, Ly are large or small. In the present embodiment the actual pixel block size mb, nb is determined as follows:

$$mb = m_0 \left(1 - \frac{d}{255}\right)\left(1 - \frac{Lx}{m_0}\right)$$
$$nb = n_0 \left(1 - \frac{d}{255}\right)\left(1 - \frac{Ly}{n_0}\right)$$
(results in integers)

The values of mb and nb may also be determined from a table, according to the values of d, Lx and Ly.

Step S10

Figure 5A:
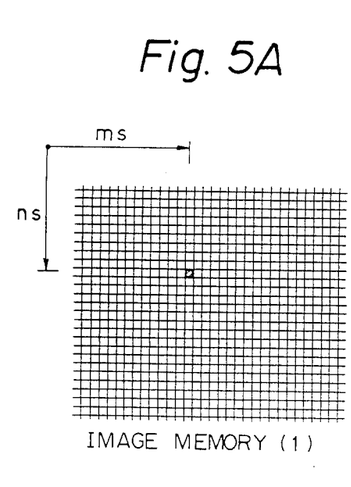
FIGS. 5A and 5B are views showing the examples of parameter setting.
Figure 5B:
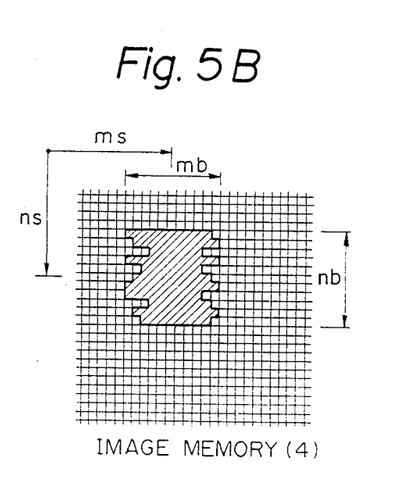

The value of (ms, ns) in the image memory (1) is written in arbitrary positions in a block surrounded by four points $(ms-mb/2, ns-nb/2)$, $(ms+mb/2, ns-nb/2)$, $(ms+mb/2, ns+nb/2)$ and $(ms-mb/2, ns+nb/2)$ on the image memory (4) as shown in FIGS. 5A and 5B, according to the size mb, nb determined in the step S9. This operation is executed in the case that the control parameter IP2=1. In the case that of IP2=2 or IP2=3, a similar writing of the selected value is conducted from the image memory (2) to the image memory (5), or from the image memory (3) to the image memory (6), respectively.

Steps S11 and S12

A step S11 stepwise increases the count of the control parameter IP2. Then a step S12 discriminates the count of said parameter, and the program proceeds to a step S13 or returns to the step S8 respectively when IP2 is larger than P2, or when IP2 is equal to or smaller than P2. In this manner the steps S8–S12 are repeated P2 times to write pixel blocks number to P2 into the image memories (4), (5) and (6).

Step S13

This step stepwise increases the control parameter IP1, and the program proceeds to the step S5.

Through the digital image processing explained above, the image data of R, G and B components are respectively stored in the image memories (4) 23, (5) 24 and (6) 25.

In the foregoing explanation, the size $mb \times nb$ of the actual pixel block is determined, in the step S9, by the difference between the maximum and minimum values in the pixel block $m_0 \times n_0$, or by the distance between the pixels of the maximum and minimum values, but it may also be determined in the following manner.

A similar effect can be achieved by the sum of the values of the mutually neighboring pixels in the pixel block $m_0 \times n_0$, or, more specifically, by employing image data subjected to a Laplacian or other differential operator in the image memory (7), calculating the sum S of the values of such image in the pixel block $m_0 \times n_0$, and increasing or decreasing mb, nb respectively when said sum S is small or large.

As explained in the foregoing, the present embodiment is capable of creating a novel image in comparison with the conventional mosaic processing of regular rectangular mosaic pattern.

Also, the mosaic processing can effectively reproduce the characteristics of the original image information since the size of the mosaic or pixel block is not uniform but is made smaller or larger respectively where the image contrast is higher or lower. For example, in the case of a photograph, the out-of-focus area outside the main object can be reproduced with large mosaics.

Also, the mosaic processing can effectively reproduce the characteristics of the original image information since the mosaic is made smaller or larger respectively where the image is finer (high spatial frequency) or rougher (low spatial frequency).

Figure 6A:
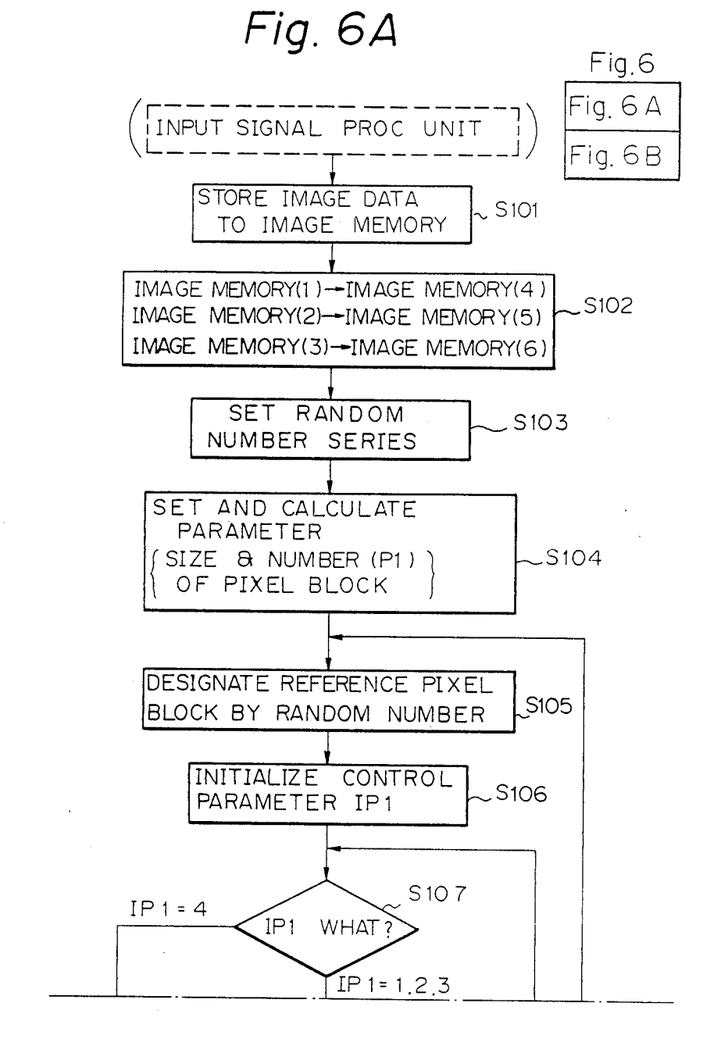
Figure 6B:
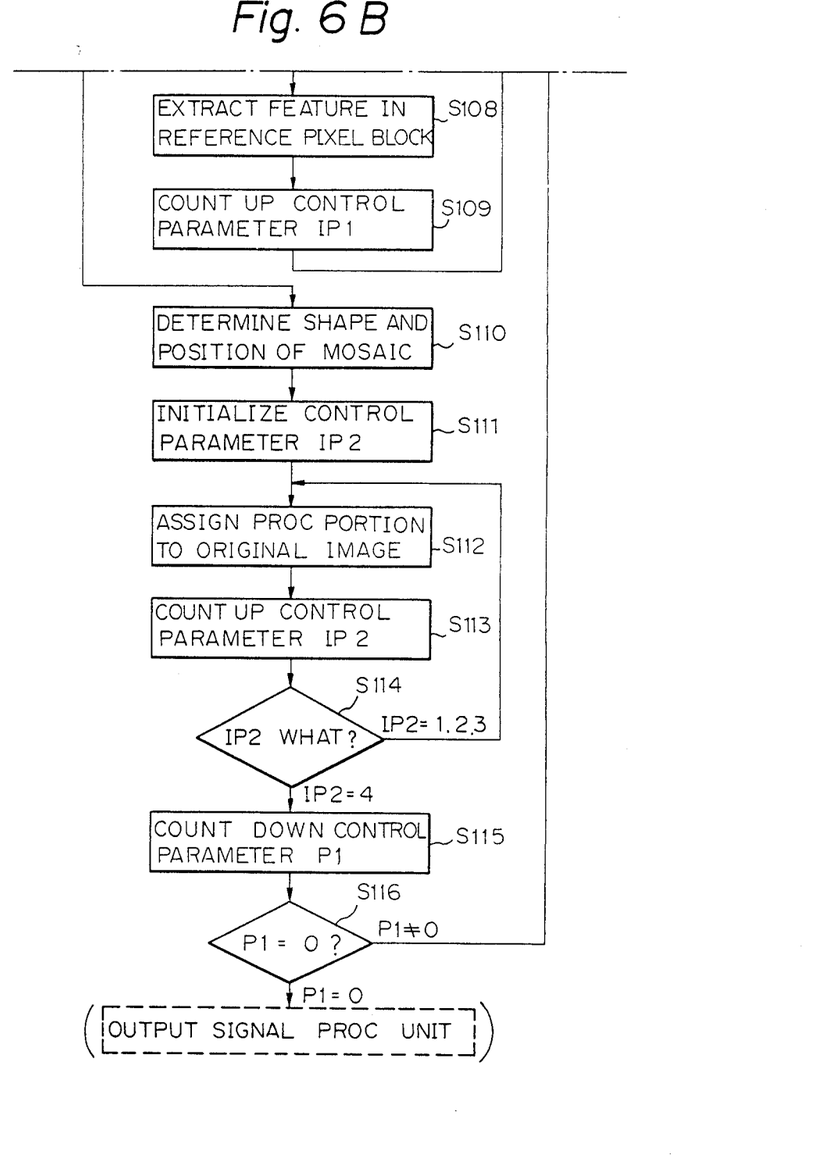

Now reference is made to a flow chart shown in FIG. 6, consisting of FIGS. 6A and 6B for explaining a second embodiment of the present invention.

Step S101

In response to a command from the CPU 11, the processor 18 stores the red (R) component image data of the original image, received from the input signal processing unit 4 (FIG. 1) through the image data I/O 36, into the image memory (1) 20. Subsequently it stores the green (G) component image data and the blue (B) component image data respectively in the image memories (2) 21 and (3) 22. In this state the look-up tables (1)–(8) 28–35 are in the standard state shown in FIG. 4A.

Step S102

The processor 18 transfers the image data in the image memory (1) 20 into the image memory (4) 23.

Since the look-up table (1) 28 is in the standard state shown in FIG. 4A, the content of the image memory (1) 20 is copied, without change, in the image memory (4) 23. Similarly the image data in the image memories (2) 21 and (3) 22 are respectively copied in the image memories (5) 24 and (6) 25.

Step S103

This step sets the random numbers to be employed in the following processing.

Step S104

This step sets the parameters required for the operation. In the present embodiment there is entered a parameter $n_0$ indicating the size of the reference pixel block $n_0 \times n_0$, from an unrepresented keyboard through the parameter setting I/O 16. In the present embodiment said parameter is entered by the operator through the parameter setting I/O 16, but it can be stored in the parameter memory 15 and automatically set without entry by the operator Then the total number P1 of pixel blocks, which is a parameter required in the following processing, can be determined from the size $n_0 \times n_0$ of thus determined pixel block and the size $M \times N$ of the image data, according to the following equation:

$$P1 = (M/n_0) \times (N/n_0) \times 4$$

wherein P1 is taken as an integer.

Step S105

The position of a reference pixel block is designated by random numbers in the following manner. Random numbers are generated in a range from 0 to $M - n_0$ in the x-direction, and from 0 to $N - n_0$ in the y-direction. The reference pixel block consists of a square area of which diagonal corners are defined by (Rx, Ry) and $(Rx + n_0 - 1, Ry + n_0 - 1)$ wherein Rx and Ry are thus generated random numbers.

Step S106

This step initializes the control parameter IP1, employed in the following process control, to IP1=1, for referring to the image memory (4) 23. In a state IP1=2 or IP1=3, reference is respectively made to the image memory (5) 24 or (6) 25.

Step S107

This step designates the image memories (4), (5) and (6) in succession, according to the state of the IP1.

Step S108

This step determines the center of the reference image block, compares the values of the pixels positioned laterally of said center in the block, and determines the distance of the pixels having maximum and minimum values. Similarly a distance is determined in the vertical direction. These two values are stored in the parameter memory 15.

Step S109

This step increases the count of the control parameter IP1.

Step S110

The distances in the lateral and vertical directions, determined in the step S108 are averaged to obtain a vertical-to-lateral ratio, from which the form of the process pixel block is determined. More specifically the average lateral distance dx and the average vertical distance dy are determined by:

$$dx = (dx1 + dx2 + dx3)/3$$

$$dy = (dy1 + dy2 + dy3)/3$$

wherein (dx1, dy1), (dx2, dy2) and (dx3, dy3) are the lateral and vertical distances respectively for the image memories (4), (5) and (6) determined in the step S108. Thus, by assigning n0 as a side of the process pixel block to the longer of the lateral and vertical distances, the shorter one is obtained by $(dy/dx) \times n_0$ if the lateral direction is longer, or by $(dx/dy) \times n_0$ if the vertical direction is longer. In this manner the form of the process pixel block is determined for each reference block. Then the position of the process pixel block is determined. For a reference pixel block with upper left and lower right corners respectively at $(Rx + n_0 - 1, Ry + n_0 - 1)$, the center thereof (xc, yc) can be defined as:

$$\left( Rx + \frac{n_0 - 1}{2}, Ry + \frac{n_0 - 1}{2} \right)$$

wherein xc and yc are taken as integers. In the case of defining a vertically oblong process pixel block with a vertical length $n_0$ and a lateral length $(dx/dy) \times n_0$, the coordinates of the upper left and lower right corners are represented by:

$$\left( Rx + \frac{n_0 - 1}{2} - \frac{(dx/dy) \times n_0 - 1}{2}, Ry \right)$$

$$\left( Rx + \frac{n_0 - 1}{2} + \frac{(dx/dy) \times n_0 - 1}{2}, Ry + n_0 - 1 \right)$$

wherein these coordinates are taken as integers. The position of the process pixel block is thus determined in consideration of the center of the reference pixel block.

Steps S111 and S112

A step S111 initializes the control parameter IP2 employed in controlling the following operation, and a step S112 transfers a portion of the original image to be processed. More specifically, the data of an image memory designated by the control parameter IP2 are copied by the processor 18 in the image memory (8) 27. The image memory (1) 20, (2) 21 or (3) 22 is designated respectively when IP2 = 1, 2 or 3. Subsequently the pixel block determined in the step S110 is replaced by the representative value of the block. In the present example, the representative value indicates the value at the center of the reference pixel block. The foregoing operation wherein the data in the process pixel block are changed to a(xc, yc), in which a(m, n) generally represents the data in the image memory (8) 27, can be represented by the following equation:

$$a(xc + i, yc + j) = a(xc, yc)$$

wherein $$-\frac{(dx/dy) \times n0 - 1}{2} \leq i \leq \frac{(dx/dy) \times n0 - 1}{2}$$

and $$-\frac{n0 - 1}{2} \leq j \leq \frac{n0 - 1}{2}$$

if the determined form is vertically oblong, and $$-\frac{n0 - 1}{2} \leq i \leq \frac{n0 - 1}{2}$$

and $$-\frac{(dy/dx) \times n0 - 1}{2} \leq j \leq \frac{(dy/dx) \times n0 - 1}{2}$$

if the determined form is laterally oblong, and i and j are taken as integers.

Steps S113 and S114

A step S113 performs a counting up of the control parameter IP2.

A step S114 selects an image memory to be processed, according to the parameter IP2.

Steps S115 and S116

A step S115 performs a counting down of the control parameter P1.

A step S116 identifies whether the control parameter P1, indicating the number of reference blocks to be processed, is equal to zero, and, if not, the steps S105 to S114 are repeated until said parameter reaches zero. The process of the steps S105 to S114 is completed for each of the reference blocks when the parameter P1 reaches zero.

After the above-explained digital image processing, the red, green and blue components of the mosaic processed image data are respectively stored in the image memories (1) 20, (2) 21 and (3) 22.

The determination of the form, or the vertical-to-lateral ratio, may also be based on another parameter, for example comparison with the averaged data of the reference pixel block. It is furthermore possible to define a minimum area for avoiding the formation of a small form not effective in the processed image, and to define a process pixel based on the vertical-to-lateral ratio, exceeding the reference pixel block.

As explained in the foregoing, the present embodiment allows one to create novel images in which a mosaic pattern shows variations in comparison with the regular rectangular mosaic pattern in the conventional technology. Also the quality of the original image is retained since the forms of the blocks resemble the form of the object in the image.

Figure 7:
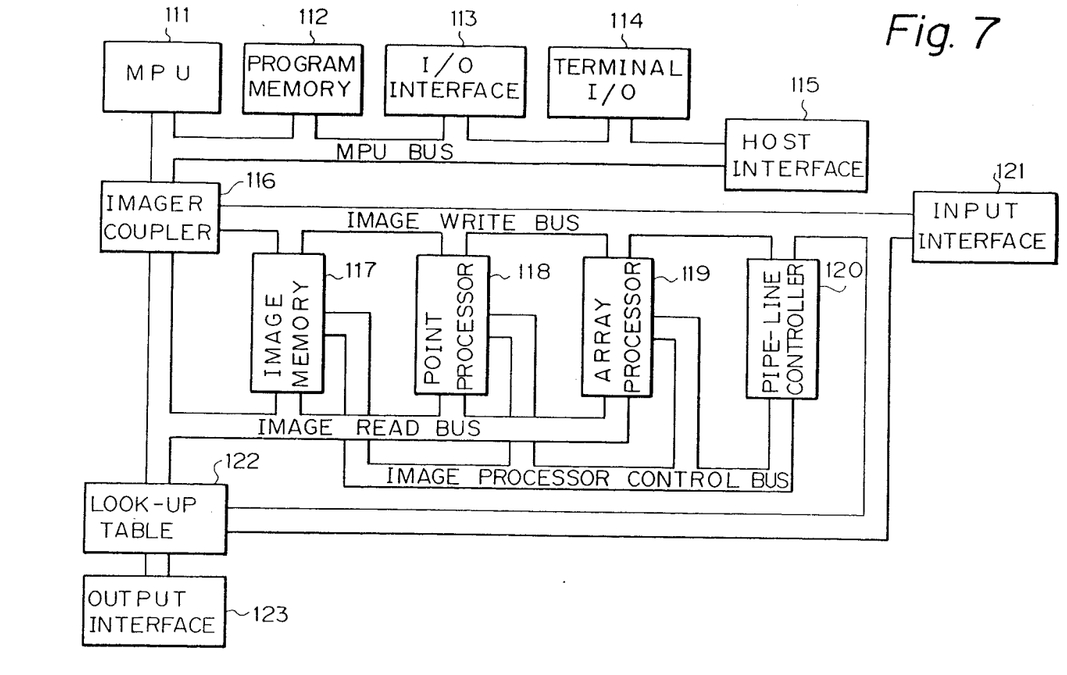
FIG. 7 is a block diagram showing the details of a part of an image processing unit 5 in a third embodiment.

Now there will be explained a third embodiment of the present invention, employing a different structure in the image processing unit 5 as detailedly shown in FIG. 7. In FIG. 7, a microprocessing unit (MPU) 111 is a principal element for controlling said processing unit, and performs control through an MPU bus by executing a program stored in a program memory 112. An I/O interface 113 controls memory media such as disks or memory tapes. A terminal interface 114 enters parameters required for the control operation of MPU and releases messages from the MPU to the user. A host interface 115 for connection with an external computer for controlling the image processing apparatus from the outside, and is capable, for example, of data transfer. An imager coupler 116 transfers data and results of processing between the processor or memories involved in the actual image processing and the MPU. A part of the data in an image memory 117 selected by a pipeline controller 120 is transferred, through an image reading bus, to a point processor 118 or an array processor 119. Said data are processed in the processors 118, 119 in synchronization with the pipeline controller, and written again in the image memory 117 through an image write bus. A look-up table 122 is provided to convert the depth of the data in the image memory 117, and allows one to observe an image on a cathode ray tube or on a print through an output interface 123. Also the data may be returned to the original image memory 117 through said look-up table 122. An input interface 121 is used as an interface with an apparatus capable of directly entering an image into the image memory 117.

Figure 8:
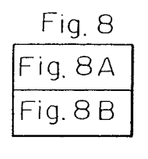
FIGS. 8, 8A and 8B are a flow chart of image processing in said third embodiment.
Figure 8A:
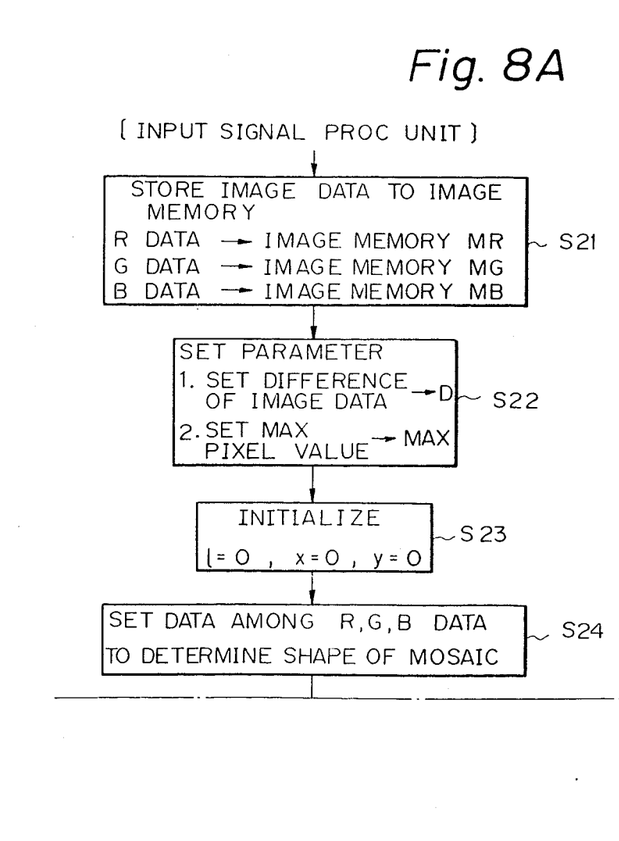
Figure 8B:
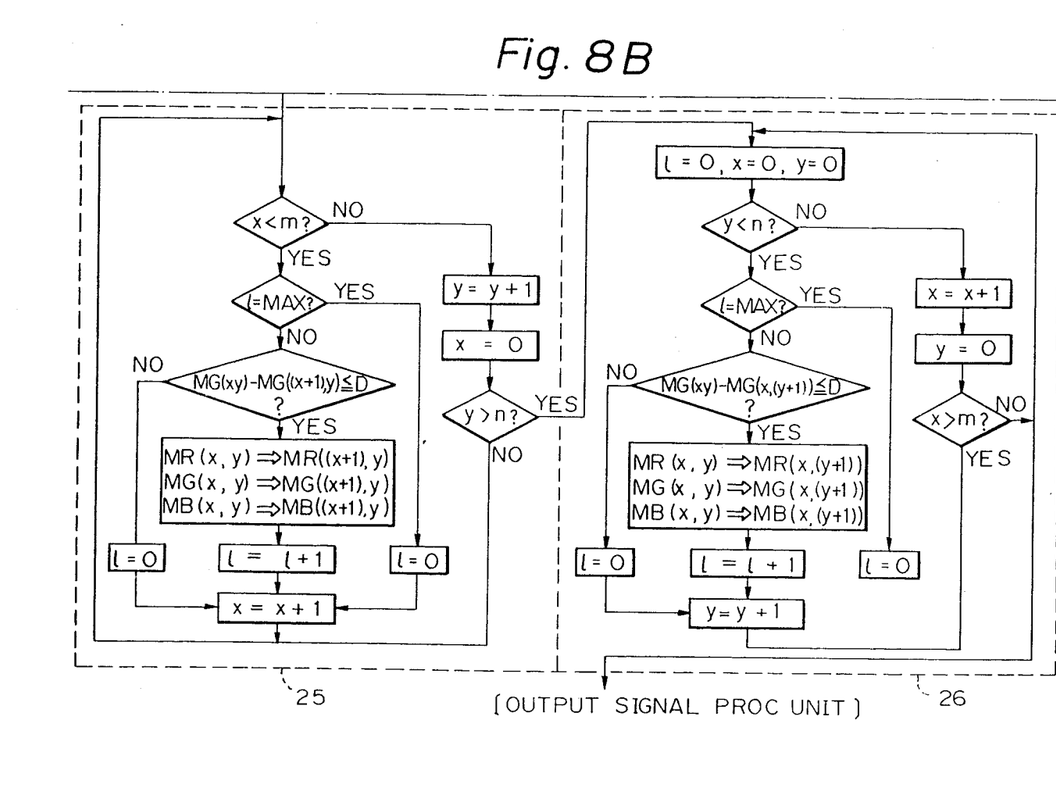

In the following there will be explained a digital image processing conducted in the image processing unit 5 for obtaining a special image effect, while making reference to a flow chart shown in FIG. 8. In the following MR(x, y), MG(x, y) and MB(x, y) respectively represent red, green and blue components of the density data of the digital image. Also it is assumed that an image frame is composed of m×n pixels each having i bits for reproducing $2^i$ density levels.

Step S21

In response to a command supplied by the MPU 111 through the imager coupler 116, digitized image signals of red, green and blue are transferred to the image memory 117 through the input interface 121, the I/O interface 113 or the host interface 115.

Step S22

This step sets parameters required for the operation. In the present embodiment, the operator sets, through a keyboard and the terminal I/O 114, a maximum difference D of the pixel data, and a maximum number MAX of the pixels of a same value. If the difference of the values of two neighboring pixels is equal to or less than D, these two pixels are replaced by the value of either pixel, but, if said difference is larger than D, these two pixels are retained at the original values. The difference D is selected in the following range:

$$0 \leq D \leq 2^i$$

wherein i is the number of bits of said value.

After two neighboring pixels of which the difference in values does not exceed D are converted into the same value as explained above, said value may not be different by D from the value of a third neighboring pixel. Such conversion to the same value may continue up to a certain maximum number MAX of pixels, but, for the pixels exceeding said number, the value of such excess pixel is employed. The number MAX indicates such maximum number of pixels, and is selected within the following range:

$$1 \leq MAX \leq m \text{ or } n.$$

Step S 23

This step initializes the data (x, y), indicating the starting point of image processing, and an internal counter to zero.

Step S24

The mosaic form is determined from the values D and MAX, and the input pixel data. This step selects the red, green or blue pixel data for processing.

Step S25

This step executes the processing in the x-direction. At first there is conducted a discrimination whether a value m is reached in the x-direction, and, if not, a value 1 is discriminated. This operation is to suspend the above-mentioned value conversion if the number of conversions already has reached the number MAX. If said number has not been reached, there is then conducted a discrimination whether such conversion is to be made. In practice a comparison is made between (x, y) and ((x+1), y), and these two data are left unchanged if the difference exceeds the number D, and the process then proceed to next two data. On the other hand, if said difference is equal to or less than D, the value of ((x+1), y) is replaced by that of (x, y) for each of the red, green and blue signal. This operation is repeated up to an address m−1 in the x-direction, and the same process is then repeated from x=0, for a line y+1. The process is completed when y reaches n, and the program proceeds to the next step.

Step S26

After the completion of processing in the x-direction, this step executes the processing in the y-direction, in the same manner as in the x-direction. All the processing is completed when x reaches m.

Through the above-explained processing the original image is erased. However such erasure of the original image can be avoided by storing the output of each process in another area of the image memory 117.

As explained in the foregoing, the present embodiment allows one to create novel images because the mosaic pattern is variable and the rectangular pattern is less conspicuous in comparison with the conventional regular rectangular mosaic pattern. Also the contour information of the original image is not lost and the image quality is retained, since the mosaic pattern is variable. Furthermore, various output images can be obtained from a single original image, by changing the maximum difference D, the maximum number of pixels and the sequence of processing.

Furthermore, though the present embodiment detects the density one-dimensionally, it is also possible to detect the density two-dimensionally.

The first, second and third embodiments of the present invention employ an exclusive image processor in the image processing unit, but the same effect can be naturally obtained through the use of a generalpurpose computer such as a minicomputer.

Also the foregoing embodiments are limited to image entry from a film, but the same effect can be attained by directly entering the image data from a video camera, a still video camera etc., or entering the image data through a recording medium such as a floppy disk, a magnetic tape or an optical disk.

As explained in the foregoing, the present invention allows one to create novel images and to provide a mosaic process effectively utilizing the features of the original image, in comparison with the conventional regular mosaic processing. For example, an extremely marked effect can be achieved by varying the mosaic form according to the contrast or the spatial frequency of the original image.

Also, it is rendered possible to retain the quality of the original image and to obtain creative images without relying on the artistic skill of the operator, since the block form of mosaic process resembles that of the object in the original image.

Furthermore, it is rendered possible to obtain novel images and to expand the freedom of image formation, which cannot be expected in the conventional photographic darkroom process or in the electronic plate-making process. Also, there is provided a possibility of image processing in a laboratory service since the image processing can be automated without the operator.

The present invention is not limited to the foregoing embodiments but is subject to various modifications within the scope and spirit of the appended claims.

What is claimed is:

1. An image processing method comprising the steps of:
   dividing an original image into plural areas each composed of plural pixels, wherein image data of each of the plural pixels is multi-level image data representing an image density;
   changing a shape of the area in accordance with a contrast of the original image; and
   conversion processing, including defining the multi-level image data of a predetermined pixel within each area as a representative value, the image data of the plural pixels within the area into said representative value.

2. An image processing method according to claim 1, wherein the contrast is detected from the difference between maximum and minimum values of the image data within a predetermined image area.

3. An image processing method according to claim 1, wherein the size of said areas is made smaller as said contrast becomes larger.

4. A method according to claim 1, wherein the areas are produced at random in one image plane of the original image.

5. A method according to claim 1, wherein the image data consists of plural color data for one pixel.

6. A method according to claim 5, wherein said conversion processing is performed on the plural color data, and at that time the shape of the area is left unchanged even if the color data is changed.

7. An image processing method comprising the steps of:
   extracting features relating to the form of an image, from image data of plural areas in an image;
   defining blocks according to said features; and
   converting all the pixel data in each of said blocks to a predetermined representative value,
   wherein, in said extracting step, the distance between the maximum and minimum values of the image in the area is detected, and wherein the vertical-to-lateral ratio of said block is determined according to said distance.

8. An image processing method comprising the steps of:
   extracting features relating to the form of an image, from image data of plural areas in an image;
   defining blocks according to said features; and
   converting all the pixel data in each of said blocks to a predetermined representative value,
   wherein, in said extracting step, the distance between the maximum and minimum values of the image in the area is detected, and wherein said distance is detected in two mutually perpendicular directions.

9. An image processing method comprising the steps of:
   detecting changes in image data of an image frame;
   defining plural blocks of sizes according to said changes; and
   converting all the image data in each of said blocks into a predetermined representative value,
   wherein said detecting step is adapted to detect whether the difference of data between neighboring pixels exceeds a predetermined value or not, and
   wherein the boundary of said block is defined where said difference not exceeding said predetermined value is detected consecutively for a predetermined number of times.

10. An image processing method comprising the steps of:
    dividing an original image into plural areas each composed of plural pixels, wherein image data of each of the plural pixels is multi-level image data representing an image density, and wherein the areas are produced at random in one image plane of the original image;
    changing a shape of the area in accordance with a spatial frequency of the original image; and
    conversion processing, including defining the multi-level image data of the predetermined pixel within each area as a representative value, the image data of the plural pixels within the area into the representative value.

11. A method according to claim 10, wherein the spatial frequency is detected from information on positions of maximum and minimum values of the original image data within a predetermined image area.

12. A method according to claim 10, wherein the sizes of the areas are made smaller as the spatial frequency becomes higher.

13. A method according to claim 10, wherein the image data consists of plural color data for one pixel.

14. A method according to claim 13, wherein said conversion processing is performed on the plural color data, and at that time the shape of the area is left unchanged even if the color data is changed.

15. An image processing apparatus comprising:
    random signal generation means for generating a random signal which represents a desired position within one image plane of an original image;
    block setting means for setting a block consisting of plural multi-level image data, on the basis of the random signal generated by said random signal generation means; and
    process means for conversion processing, including defining the multi-level image data of a predetermined pixel within the block as a representative value, the image data of plural pixels within the block into the representative value,
    wherein said random signal generation means generates plural random signals and said block setting means sets within one image plane the plural blocks to be conversion-processed by said process means based on the plural random signals.

16. An apparatus according to claim 15, further comprising input means for inputting a number of the blocks set by said block setting means, and said random signal generation means generates the random signals corresponding to the number input by said input means.

17. An apparatus according to claim 15, further comprising detection means for detecting a feature of the image data of the original image, and wherein said block setting means sets the block of different size according to the feature detected by said detection means.

18. An image processing apparatus comprising:
block setting means for setting a block consisting of image data of plural pixels of an original image, wherein the image data is multi-level image data representing a density of the original image; and
process means for converting, including defining the multi-level image data of the predetermined pixel within the block set by said block setting means as a representative value, the image data of the plural pixels within the block into the representative value to be mosaic-processed,
wherein said block setting means sets first and second plural blocks within one image plane and longitudinal-to-lateral ratios of the first and second blocks are different from each other.

19. An apparatus according to claim 18, wherein the image data consists of plural color data for one pixel.

20. An apparatus according to claim 19, wherein said process means performs the mosaic process for plural color data, and at that time said process means does not change a shape of the block even if the color data is changed.

21. An image processing apparatus comprising:
block setting means for setting a block consisting of image data of plural pixels of an original image, wherein the image data is multi-level image data representing a density of the original image; and
process means for converting, including defining the multi-level image data of the predetermined pixel within the block set by said block setting means as a representative value, the image data of the plural pixels within the block into the representative value to be mosaic-processed,
wherein said block setting means sets first and second plural blocks within one image plane,
longitudinal-to-lateral ratios of the first and second blocks are different from each other,
the image data consists of plural color data for one pixel, and
said process means performs the mosaic process for plural color data.

* * * * *

UNITED STATES PATENT AND TRADEMARK OFFICE
CERTIFICATE OF CORRECTION

PATENT NO. : 4,953,227

DATED : August 28, 1990

INVENTOR(S) : Makoto Katsuma, et al.

It is certified that error appears in the above-identified patent and that said Letters Patent is hereby corrected as shown below:

COLUMN 1

Line 59, "pixels..The" should read --pixels.  The--.

COLUMN 3

Line 1, "FIGS. 6, 6A and 6B" should read
          --FIGS. 6A and 6B--.
    Line 6, "FIGS. 8, 8A and 8B" should read
          --FIGS. 8A and 8B--.
    Line 13, "drawings" should read --drawings.--.

COLUMN 8

Line 21, "operator" should read --operator.--.

COLUMN 9

Line 12, "n0" should read --$n_o$--.

Signed and Sealed this

Twenty-first Day of July, 1992

Attest:

DOUGLAS B. COMER

*Attesting Officer*   *Acting Commissioner of Patents and Trademarks*